No. 681,614. Patented Aug. 27, 1901.
H. H. BOWEN & F. T. HARMON.
SUPPORT FOR CAMERAS OR PHOTOGRAPHIC APPARATUS.
(Application filed June 29, 1900.)
(No Model.)
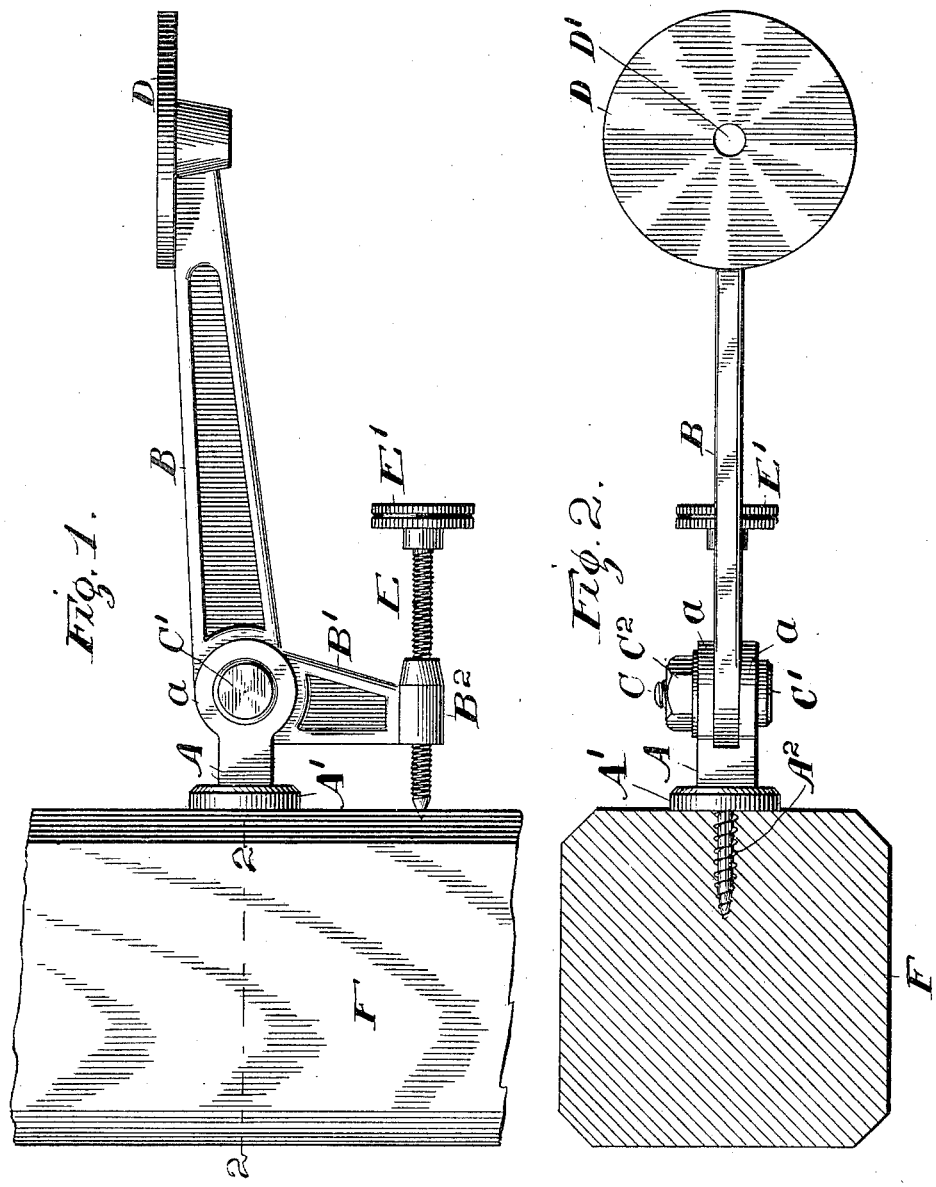

UNITED STATES PATENT OFFICE.

HANDY H. BOWEN AND FRANCIS T. HARMON, OF CHICAGO, ILLINOIS; SAID HARMON ASSIGNOR TO SAID BOWEN.

SUPPORT FOR CAMERAS OR PHOTOGRAPHIC APPARATUS.

SPECIFICATION forming part of Letters Patent No. 681,614, dated August 27, 1901.

Application filed June 29, 1900. Serial No. 22,097. (No model.)

*To all whom it may concern:*

Be it known that we, HANDY H. BOWEN and FRANCIS T. HARMON, citizens of the United States, residing at Chicago, in the county of Cook and State of Illinois, have invented a new and useful Support for Cameras, of which the following is a specification.

Our invention relates to improvements in supports for cameras, its object being to provide a simple and practical device adapted to be readily and securely attached to a post, tree, or the like stationary object and to form a sufficiently stable camera-support adjustable in different directions, and thereby adapted to secure any desired adjustment of the camera.

The invention is fully described, explained, and claimed in this specification, and shown in the accompanying drawings, in which—

Figure 1 is a side elevation of a preferred form of our improved camera-support, the same being attached to a wooden post and supported thereby. Fig. 2 is a top plan of the camera-support, the post to which it is attached being shown in horizontal section through the plane 2 2 of Fig. 1.

In the views, A is a bracket preferably provided with a boss or collar $A'$ and having an ordinary wood-screw $A^2$, adapted for insertion in the ordinary way in any stationary wooden support F, which may be a post, a tree, a wall, or the like. The bracket A is provided at its outer end with two parallel ears $a\ a$, separated by suitable space adapted to receive a bar preferably in the form of a bell-crank lever made up of two arms B B'. A pivotal bolt C passes through the ears $a\ a$ and through the angle of the bar B B' and is held in place by means of a head $C'$ on one end of the bolt and a nut $C^2$ on the other end thereof, and the bolt forms a pivot whereon the bar may rock in its own plane. The longer arm B of the bell-crank lever is approximately horizontal in the use of the device and is provided at its outer end with a preferably circular disk D, adapted to form the immediate support of a camera and having at its center a hole $D'$, adapted to receive the ordinary bolt for fastening the camera to its support, the camera being provided in the usual way with a nut corresponding to the bolt and adapted to receive and engage it. So far as this fastening of the camera to the plate is concerned it is the ordinary and usual way of fastening a camera to a tripod-plate, and the disk D is provided with a central hole merely as a means of adapting it to this ordinary and well-known use. The shorter arm $B'$ of the bell-crank lever has at its lower or free end a socket $B^2$, internally screw-threaded to receive an adjusting-screw E, having a head $E'$ of any suitable form adapted to be readily turned by the fingers. It is evident that the screw $A^2$ of this device may be readily inserted in any stationary wooden structure, that when it is so inserted the bracket A, the screw $A^2$, and the parts supported by the bracket may be rotated in either direction, and that a camera mounted on the disk D and having its axis at right angles to the bar B B' may thus be adjusted in such a way as to change the inclination of its axis. In other words, the camera may be adjusted, by means of the rotation of the bracket A and screw $A^2$, so as to make the axis of the camera horizontal or incline it either downward or upward from a horizontal position. It is equally apparent that by means of the adjusting-screw E the longer arm B of the bell-crank lever may be adjusted to any desired inclination, thereby raising or lowering the camera to a corresponding degree. Evidently, therefore, this simple device not only provides a readily-placed and perfectly-secure support for the camera, but it also furnishes all necessary adjustment for giving the camera any desired position. At the same time the whole device is small, simple, inexpensive, and much more readily portable than any tripod, although under most conditions it is much more readily and perfectly adjustable than the tripod.

Having now described and explained our invention, what we claim as new, and desire to secure by Letters Patent, is—

1. In a camera-support, the combination with a bracket and means for attaching it to a stationary support and permitting its axial rotation, of a bar pivoted to said bracket and provided at its free end with a suitable base for the attachment of a camera, and means for adjusting said bar by swinging it upon its pivot.

2. In a camera-support, the combination with a bracket provided with a wood-screw adapted to be inserted in any wooden support and to permit axial rotation of the bracket, of a bar pivoted to said bracket and provided at its free end with a suitable base for the attachment of a camera and means for adjusting said bar by swinging it about its pivot.

3. In a camera-support, the combination with a bracket provided with means for attaching it to a wooden support and permitting its axial rotation, of a bell-crank bar pivoted to said bracket, a suitable base for the attachment of a camera fastened to the end of one arm of said bar, and an adjusting-screw seated in the end of the other arm of said bar, said adjusting-screw being adapted to effect the swinging of the bar about its pivot.

4. The combination with the bracket, A, having the wood-screw, $A^2$, of the bell-crank bar, B, B', pivoted to said bracket, the perforated disk, D, attached to the end of the arm, B, of said bar and the adjusting-screw, E, set in the end of the arm, B', of said bar.

In testimony whereof we have signed our names as joint inventors to this specification in the presence of two subscribing witnesses.

HANDY H. BOWEN.
    FRANCIS T. HARMON.

Witnesses:
 CHAS. W. STEVENS,
 JAMES D. BRODLEY.